United States Patent
Bhaduri et al.

(10) Patent No.: US 12,047,787 B2
(45) Date of Patent: Jul. 23, 2024

(54) SYSTEMS AND METHODS FOR TRANSPORTABLE CELLULAR NETWORKS

(71) Applicant: ACCENTURE GLOBAL SOLUTIONS LIMITED, Dublin (IE)

(72) Inventors: Joydeep Bhaduri, Kolkata (IN); Madan Kumar, Bangalore (IN); Sandeep Rajagopal, Coimbatore (IN); Ramachandran Sambamurthi, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 151 days.

(21) Appl. No.: 17/735,844

(22) Filed: May 3, 2022

(65) Prior Publication Data
US 2022/0361002 A1     Nov. 10, 2022

(30) Foreign Application Priority Data
May 10, 2021    (IN) .............................. 202111021134

(51) Int. Cl.
*H04W 16/24*       (2009.01)
*H04W 84/00*       (2009.01)

(52) U.S. Cl.
CPC .......... *H04W 16/24* (2013.01); *H04W 84/005* (2013.01)

(58) Field of Classification Search
CPC ............ H04B 7/185–18506; H04W 16/24–26; H04W 84/005; H04W 84/06; H04W 88/08
See application file for complete search history.

(56) References Cited

U.S. PATENT DOCUMENTS

2017/0257779 A1*   9/2017   Zerick ................ H04B 7/18506

FOREIGN PATENT DOCUMENTS

| WO | WO-2019224649 A1 * | 11/2019 | ............ H04W 16/18 |
| WO | WO-2020236041 A1 * | 11/2020 | ............ H04W 24/02 |

* cited by examiner

*Primary Examiner* — Ronald Eisner
(74) *Attorney, Agent, or Firm* — Mannava & Kang, P.C.

(57) ABSTRACT

A system for providing temporary, transportable cellular communications networks is disclosed. The system includes at least one mobile base station and a control system. The mobile base station can include an aerial vehicular base station with a frame and propellers mounted on the frame that enable flight of the aerial vehicular base station while the control system is configured to control the flight path and functioning of the aerial vehicular base station. The aerial vehicular base station includes hardware and software components for providing cellular network coverage for short ranges. The control system determines the safe flight path for the aerial vehicular base station to reach a service location to provide cellular network coverage. The aerial vehicular base station identifies the closest base stations and available spectrum at the service location to provide communication services for the user equipment at the service location.

19 Claims, 9 Drawing Sheets

SYSTEMS AND METHODS FOR TRANSPORTABLE CELLULAR NETWORKS

PRIORITY

The present application claims priority under 35 U.S.C. 119(a)-(d) to the Indian Provisional Patent Application Serial No. 202111021134, having a filing date of May 10, 2021, the disclosure of which is hereby incorporated by reference in its entirety.

BACKGROUND

A cellular network or mobile network is a communication network where the last link is wireless. The cellular network is distributed over land areas called "cells", each served by one or more transceivers called base transceiver stations. Base stations are generally fixed to particular locations e.g., terrestrial base stations, and may serve the user devices such as mobile devices, etc., within the "cell". Whenever an area is affected by an emergency such as a natural disaster e.g., floods, forest fires, etc., the base stations and other infrastructure may be damaged. As a result, cellular communications may be affected thereby hampering rescue operations.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
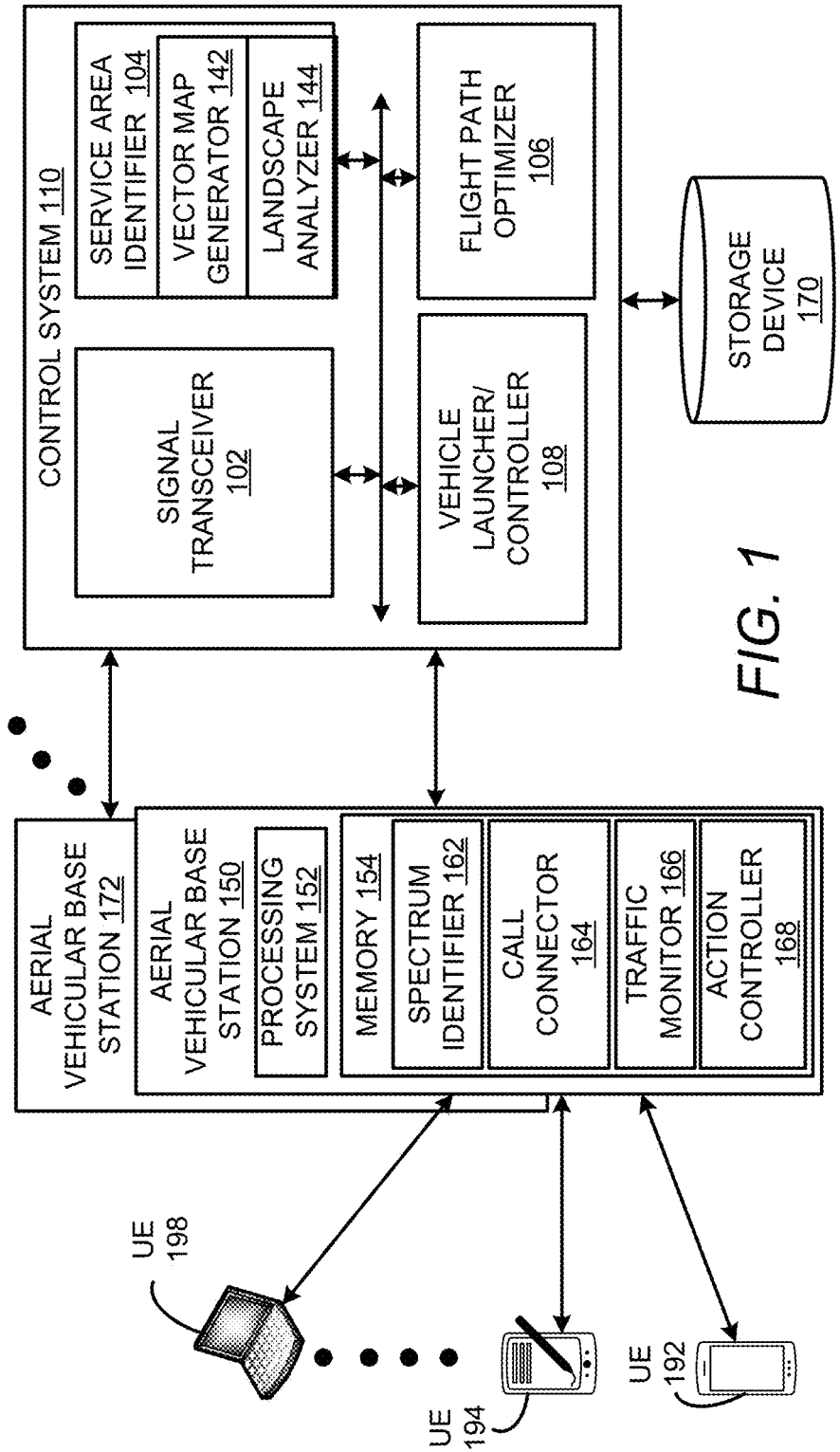
FIG. 1 shows a block diagram of a transportable cellular communications network system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Systems and methods to provide transportable cellular communication networks are disclosed. A transportable cellular communications network system includes one or more mobile base stations, and a control system configured to control the mobile base stations. In an example, a mobile base station can include a terrestrial vehicular base station or an aerial, vehicular base station. An aerial, vehicular base station may include a 'drone' which is made up of a planar body fitted with propellers that enable the aerial, vehicular base station to fly along a specified flight path. The aerial, vehicular base station is further fitted with cognitive radio (CR) hardware, an Evolved Node B, and a Long-Term Evolution (LTE) antenna that enables the aerial, vehicular base station to facilitate cellular communications at a given service location. Upon reaching the service location via a predetermined safe flight path, the aerial, vehicular base station initially identifies one or more terrestrial base stations operating within the vicinity of the location in order to connect to other networks. Terrestrial base stations may include cellular towers that are erected at particular geographical locations to provide mobile telecommunication services within a given geographical area. Furthermore, the aerial, vehicular base station may also be configured to identify available spectrum that can be used to facilitate communications for the user equipment (UE) or user devices at the service location. One or more aerial, vehicular base stations may be fitted with multiple sensors to sense various environmental conditions such as humidity, altitude, wind speed, temperature, etc. The data from the sensors is communicated back to the control system which determines if the aerial, vehicular base station(s) can continue operations at the service location or if an aerial, vehicular base station needs to be moved to a different location. The need for repositioning can arise due to worsening conditions at the service location because of the natural disaster or because of a greater need for communication infrastructure at another location. In an example, the aerial, vehicular base stations may provide for cognitive radio (CR) based moveable base stations to improve availability and transmission of signals.

The aerial, vehicular base stations constituting the transportable cellular network systems are controlled by the control system that includes the processor and memory storing instructions executed by the processor to control the aerial, vehicular base stations. The control system initially accesses incident data related to an emergency occurring in an area. The emergency may include, for example, a natural disaster spread across different geographical locations where the aerial, vehicular base stations are likely to operate. The incident data is used to generate a probability map of the area. The probability map indicates the probabilities of the aerial, vehicular base stations being affected/damaged due to different incidents. In an example, the probabilities can be calculated based on various factors such as but not limited to, altitude, latitude, longitude, velocity in X, Y, and Z directions, battery voltage of the aerial, vehicular base stations, the thrust requirements, and time which may be recorded every 100 ms for post-processing.

Techniques such as but not limited to the Bellman-Ford algorithm may be implemented to determine multiple deployment paths for the aerial, vehicular base stations based on various parameters as determined by the probability maps. If the aerial, vehicular base stations are to be deployed in disaster areas, simulations can also be executed to ensure the safe deployment of the aerial, vehicular base stations in multiple disaster scenarios including disaster recovery plans for aerial/ground vehicle movement in case of change in the environmental factors. In an example, the safest flight paths can be determined from the simulated results for multiple aerial, vehicular base stations that are to be deployed to avoid interference between the aerial, vehicular base stations.

The systems and methods that provide transportable cellular communication networks disclosed herein enable provisioning cellular network connectivity for voice calls, data communications, etc. in situations where there is a paucity of infrastructure. For example, in cases of natural disasters such as wildfires, floods, or earthquakes, cellular towers and other communication infrastructure is damaged and hence, people in some areas may become isolated unable to secure the necessary aid. Additionally, in areas where there may be moderate effects, the communication infrastructure can be congested as it will need to handle not only the regular traffic but also the additional traffic from some of the more severely affected areas. This may be due to the relocation of people from the severely affected areas to safe zones such as schools, stadiums, or other temporary locations, which causes a congregation of a large number of people (e.g., hundreds or even thousands of people) within a limited area vying for limited bandwidth. The ease of transportation and the rapid setup of the transportable cellular communication network systems disclosed herein affords an emergency relief mechanism in situations where communication infrastructure needs to be quickly reinforced with additional, temporary resources.

FIG. 1 shows a block diagram of a transportable cellular communication network system 100 in accordance with the examples disclosed herein. The system 100 includes one or more aerial vehicular base stations 150, 172, . . . , and a control system 110 to control and coordinate the vehicular base stations. Each of the plurality of aerial, vehicular base stations 150, 172, . . . has communication-enabling infrastructure including hardware and software mounted thereon, to function as a base station. The system 100 facilitates cellular communications for a plurality of user equipment (UE) 192, 194, . . . 198 in areas where there is no communication network, or where existing communication network facilities are inadequate. The plurality of aerial, vehicular, base stations 150, 172, . . . are launched and controlled by the control system 110. Each of the aerial, vehicular, base stations 150, 172, . . . , provides cellular network connectivity within a smaller range (e.g., 1-2 kilometers) as compared to a terrestrial base station, which may provide connectivity for up to 10 kilometers. Again, a plurality of control systems coupled to the corresponding plurality of aerial, vehicular base stations may be employed to provide network connectivity depending on the area to be covered. In an example, the system 100 can be employed for Global System for Mobile Communications (GSM) networks.

The control system 110 includes a signal transceiver 102, a service area identifier 104, a flight path optimizer 106, and a vehicle launcher/controller 108. The signal transceiver 102 exchanges signals with external hardware such as the plurality of aerial, vehicular base stations 150, 172, . . . . The service area identifier 104 accesses geographical maps, real-time data e.g., current landscape images, topological graphs, etc., of the area identified as requiring temporary cellular connectivity. The area may include places affected by natural disasters or places where a large number of people are temporarily gathered e.g., in stadiums or large outdoor areas hosting sporting/entertainment events, etc. Artificial Intelligence (AI) techniques are employed by a vector map generator 142 and a landscape analyzer 144 included in the service area identifier 104 to analyze and identify the requirements of the area to be serviced. The vector map generator 142 can employ support vector machines (SVMs) to generate vector maps that enable altitude measurements while landscape analyzer 144 can employ Bayesian networks to analyze virtual network topology and the landscape of the area to be serviced to estimate the network connectivity. Analyzing the virtual network topology enables accommodating or accounting for, sources of communication interferences such as dense forests, mountains, buildings, etc. Bayesian Networks may thus help to amend the virtual network topology based on recent failures, CR based network additions may help to determine the fastest hop available to connect a call to a destination.

Further, real-time data can be employed to identify void areas that have no cellular network coverage. In an example, real-time data of the weather, cellular infrastructure gained from the terrestrial base station records, can be received by the signal transceiver 102. Based on the real-time data, a group of inoperable terrestrial base stations can be identified. The terrestrial base stations may have been rendered inoperable due to damage from natural/man-mad disasters or may be inoperable as they are unable to meet the demand for data connectivity in a given geographic area. Data regarding prior locations of users using the terrestrial base stations before they were rendered inoperable may be obtained from concerned cellular service operators. When the prior user locations are combined with the map data that identifies the coverage area of each terrestrial base station, void areas without cellular network coverage or very low network coverage can be identified.

One or more of the plurality of aerial, vehicular base stations 150, 172, . . . can be launched into one of the void areas thus identified. In an example, the control system 110 can be housed in a makeshift location, e.g., a terrestrial vehicle such as a van or a tent, to control the plurality of aerial vehicular base stations 150, 172, . . . . In an example, the control system 110 can be connected to a local data store 170 to store data such as incident data, probability maps, flight paths, etc., which may be employed for controlling the aerial, vehicular base stations 150, 172, etc.

Upon identifying the void area into which one or more of the plurality of aerial, vehicular base stations 150, 172, . . . are to be launched, the flight path optimizer 106 accesses the data from the service area identifier 104 to determine the flight path for one of the plurality of aerial, vehicular base stations 150, 172, . . . e.g., the aerial vehicular base station 150. Using the real-time data from the area to be serviced, the flight path optimizer 106 determines a safe flight path to launch the aerial vehicular base station 150 into the void area. The real-time data includes data regarding areas currently under the effect of the natural disaster (e.g., burnt by forest fires or flooded or affected by an earthquake, etc.) which, in combination with the vector maps discussed above, can generate a probability map that includes the probability that the aerial vehicular base station 150 may be affected by the natural disaster, e.g., damaged by floods or forest fires. The probability map, therefore, enables identifying the obstacles in the flight path of the aerial vehicular base station 150. Tools such as Simulink® can be employed to run simulations to ensure the safe deployment of the aerial vehicular base stations 150, 172, . . . via the different low-risk paths. The safest flight paths with a minimum risk can be determined from the simulation results to launch the aerial vehicular base station(s) 150, 172, . . . .

Each of the aerial vehicular base stations, e.g., the aerial vehicular base station 150 is programmed to navigate along the safest flight path and launched by the vehicle launcher/controller 108 which receives data regarding the geographic landscape and conditions from the equipment, such as the cameras and sensors on the aerial vehicular base station 150 and other sources which may include other aerial, vehicular base stations, other control systems or even external inputs such as news feeds, weather/traffic feeds, etc. Any change in conditions is provided to the flight path optimizer 106 for recalculating the flight path and automatic image analysis may be completed in real-time to determine flight behavior. If there are changes to the flight path, then such changes are transmitted to the aerial vehicular base station 150 for redirecting it along the safest route.

The aerial vehicular base station 150 receives and stores the directions of the safest flight path, reaches a destination, and begins to establish cellular communication activities at the destination location. More particularly, the aerial vehicular base station 150 may hover at the destination location to provide cellular communication facilities to the user equipment 192, 194, . . . , 198. In an example, a drone such as AR 200 from AirRobot configured with cellular transmission tools as described herein can be used as the aerial vehicular base station 150. One of the modifications can involve loading a processing system 152 such as a Raspberry Pi along with a memory 154 onto the drone. The memory 154 can include the processor-readable instructions to be executed by the processing system 152 for implementing navigational functions and enabling cellular communication facilities. Although memory 154 is shown as being outside the processing system 152 it can be appreciated that memory 154 may be internal to the processing system 152. Accordingly, the navigation equipment of the aerial vehicular base station 150 as detailed herein enables the aerial vehicular base station 150 to travel to the destination along the safest route provided by the control system 110. In an example, the navigation equipment may have a second processor disparate from the processing system 152 to receive the coordinates of the safe flight path from the control system 110 and to direct the aerial, vehicular base station 150 to the destination/service location as directed by the safe flight path.

The memory 154 includes a spectrum identifier 162, a call connector 164, a traffic monitor 166, and an action controller 168. On reaching the service location, the spectrum identifier 162, can begin network discovery to identify communication equipment such as terrestrial base stations in the vicinity that are capable of providing communication services. In an example, techniques such as but not limited to, K Nearest Neighbor (KNN) or other distance-based metrics can be employed for the identification of the terrestrial base stations in operation around the service location. Furthermore, the spectrum identifier 162 can sense the spectrum that is available for data exchange. In an example, the call connector 164 can include a neural network trained on multiple call volumes so that the calls coming in from various networks such as 3G, 4G, 5G, etc., can be transformed into 4G/5G interconnect points. Also, among different frequencies of the spectrum such as 800 mega Hertz, 900 MHz, 2100 MHz, etc., that are used by the cellular operators, the neural network can be trained to identify the correct frequency to interconnect during a communication session. The neural networks may also be trained for performing network reconfiguration based at least on traffic volumes and spectrum sensing. The data regarding the available communication equipment and the available frequencies is employed by the call connector 164 to establish communication links between one or more of the UE 192, 194, . . . 198, and the cellular networks. In an example, connecting with a cellular network may include establishing links to operating terrestrial base stations and/or available satellite links of the networks using the available communication hardware of the aerial, vehicular base station 150 via the gaps in the spectrum identified by the spectrum identifier 162. Cognition Based networks may enable establishing the inter-networking across various bands and thereby reducing the total time for connecting a call/communication link.

The traffic monitor 166 included in the memory 124 tracks the number of communication sessions such as phone calls, or mobile data exchange facilities to project a future call volume. If the trend of the call volume shows a sharp increase or probability of rapidly increasing, the traffic monitor 166 may enable transmission of an alert to the control system 110 regarding the requirements for wider coverage and hence a necessity for a greater number of aerial vehicular base stations. In an example, Hidden Markov Models (HMM) may be implemented by the traffic monitor 166 to predict call volume.

In an example, the basis for training the HMM model is an Expectation-Maximization (E-M algorithm) including several iterations. Each iteration may comprise an "estimate" step and a "maximize" step. In the "maximize" step, each observation vector 'x' is aligned with a state 's' in the prediction model implemented by the traffic monitor 166 so that some likelihood measure is maximized. In the "estimate" step, for each state s: (a) the parameters of a statistical model for the x vectors aligned to s and (b) the state transition probabilities are estimated. In the next iteration, the maximize step runs again with the updated statistical models. The process is thus repeated a predetermined number of times or when the likelihood measure stops rising significantly (i.e., the statistical model converges to a stable solution). Finally, a HMM may typically have a designated "start" state which is aligned to the first observation of the observation sequence so that the statistical model attains each state only once.

For multiple training sequences, on the estimate step, each sequence is run so that an initial observation vector of the sequence aligns with the initial state of the HMM. Hence, the data points on that initial state are collected from the first observations over all the observation sequences, and observation vectors are aligned to the most likely states throughout each sequence. The maximize step (and future iterations) are executed after all the sequences have been provided for training. The process outlined above can be repeated for subsequent iterations.

The aerial, vehicular base station 150 can also include an action controller 168 for controlling flight and other actions taken by the aerial vehicular base station 150. In an example, the action controller 168 can include a trained neural network for determining real-time actions of the aerial, vehicular base station 150. The neural network can be trained to predict a future state of the aerial, vehicular base station 150 based on current input variables. Accordingly, the flight of the aerial, vehicular base station 150 to a particular service location or repositioning of the aerial, vehicular base station 150 within an area in response to outward stimuli is made possible.

Figure 2A:
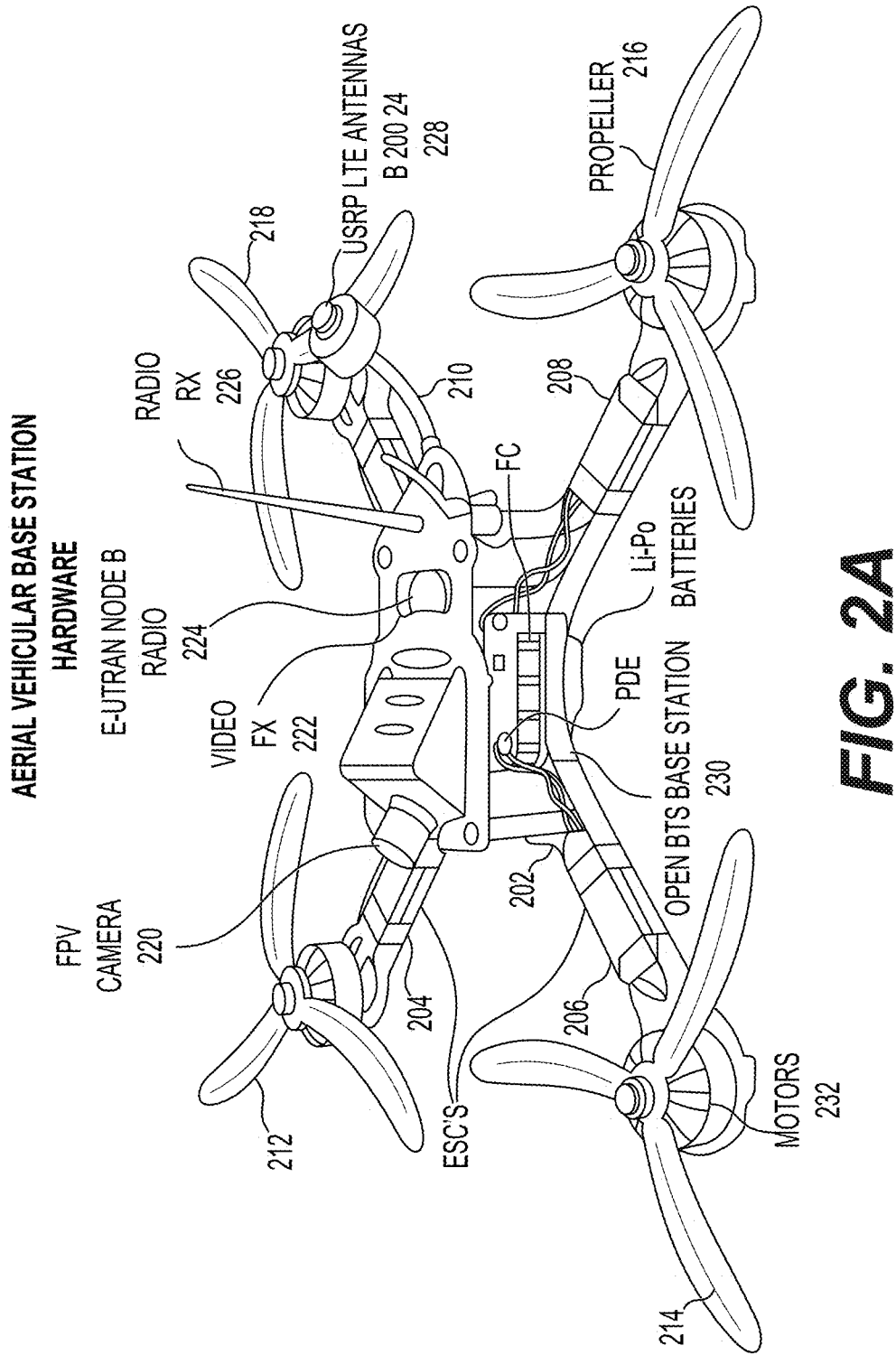
FIG. 2A shows a diagram of an aerial, vehicular base station hardware according to some examples disclosed herein.

FIG. 2A shows a diagram of the aerial, vehicular base station hardware according to some examples disclosed herein. It can be appreciated that the description and attributes of the aerial, vehicular base station are discussed below for illustration purposes only and that unmanned aerial vehicles (UAVs) with different physical attributes, sizes, etc., but configured with hardware and software tools to facilitate cellular communications may be used in accordance with other examples.

As mentioned above, Unmanned Aerial Vehicles (UAVs) such as commercially available drones reconfigured with additional components can function as aerial, vehicular base stations. The drones can weigh about 9 kilograms and may carry a payload of 900 grams to 1.5 kgs with up to 1 hour of flight time. Accordingly, the aerial, vehicular base station 150 includes a planar frame 202 with a plurality of propellers mounted on the corresponding arms or extensions, e.g., four arms 204, 206, 208, and 210 with each of the arms fitted with a corresponding one of the propellers 212, 214, 216 and 218 and motors. The aerial, vehicular base station 150 is additionally fitted with a First-person view (FPV) camera 220, an additional video camera 222, an Evolved Node B radio, or an Evolved Universal Terrestrial Radio Access Network (E-UTRAN) Node B 224 to facilitate cellular communications, a Radio receiver 226 for exchanging radio signals with other drones or nearby equipment, a Universal Software Radio Peripheral (USRP) Long Term Evolution (LTE) Antenna 228 which is a device with software-defined radios (SDR) used for Radio Frequency (RF) applications, and an Open Base Transceiver Station (BTS) Operating System 230. Other additional equipment such as a Li-Polymer battery, Flight Controller (FC), Power Distribution Equipment (PDE), etc., are also mounted.

Figure 2B:
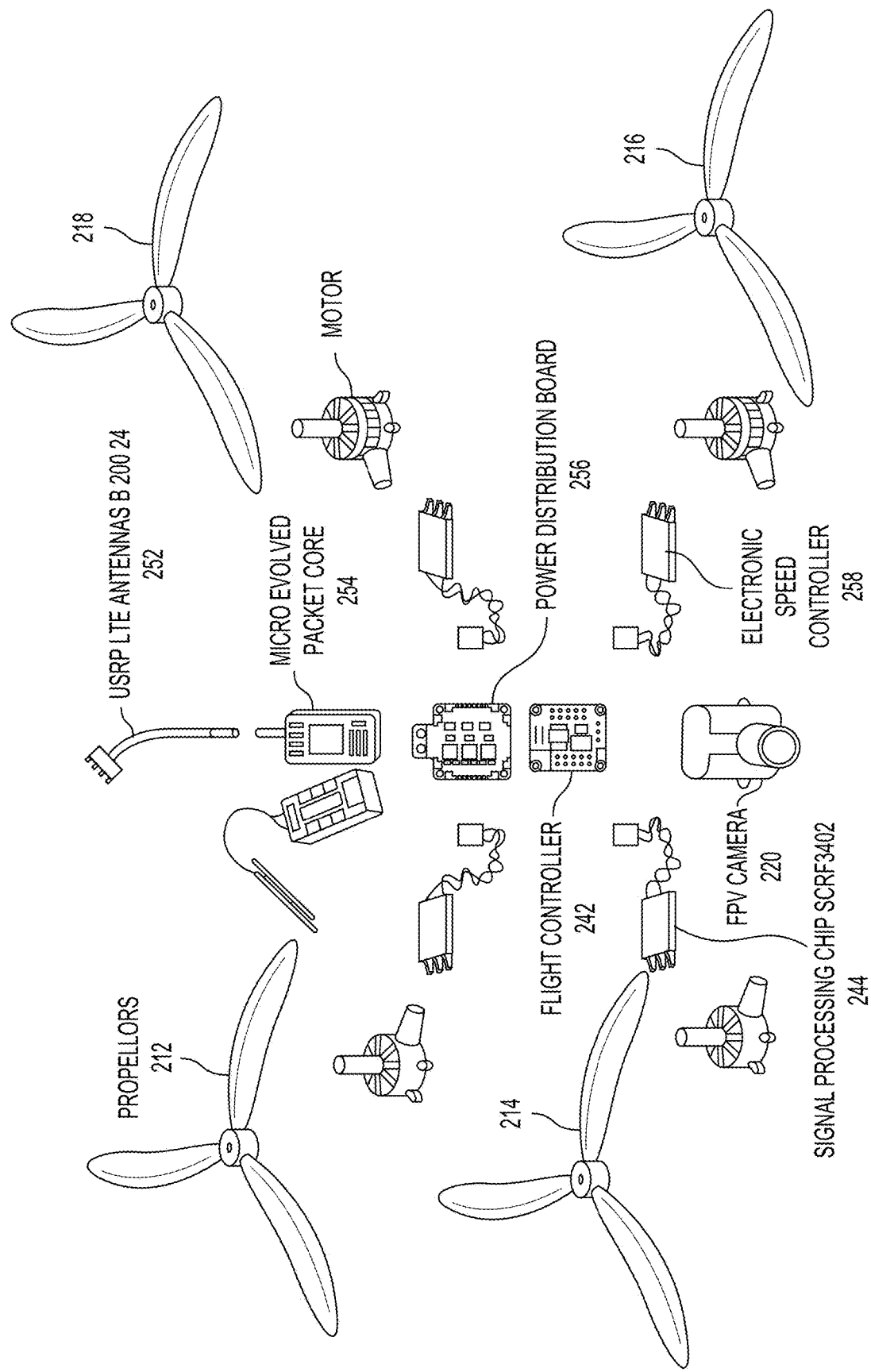
FIG. 2B shows the hardware mounted on the aerial, vehicular base station to facilitate establishing cellular communications according to some examples.

FIG. 2B shows the details of the hardware mounted on the aerial, vehicular base station 150 to facilitate establishing cellular communications according to some examples. In addition to propellers 212, 214, 216, and 218 and motors to drive the propellers, the aerial, vehicular base station 150 includes the FPV camera 220, which is also known as a remote-person view (RPV), or simply video piloting. The FPV camera 220 can be used to control the aerial, vehicular base station 150 from the driver or pilot's viewpoint. The E-UTRAN Node B 224 forms a part of the hardware for providing cellular services by enabling transmission and reception of 2G, 3G, 4G cellular waves thereby providing network coverage. The E-UTRAN Node B 224 forms the base station of the E-UTRAN communication network. It facilitates the network by transmission and reception of many traffic types from real-time Circuit Switched to Internet Protocol (IP) based Packet Switched signals and allows connectivity between the UE 192, 194, . . . , 198 and the core network. The Universal Software Radio Peripheral (USRP) Long Term Evolution (LTE) antennas 252 enable the transmission and the reception of the LTE signals.

The base station hardware provisioned on the aerial, vehicular base station 150 also includes the processing system 152 along with a signal processing chip 244 e.g., SCRF 3402. The processing system 152 may include a Raspberry Pi baseboard which operates on an open base transceiver station (BTS) operating system. The open BTS operating system can be further modified to enable the execution of the spectrum identifier 162, the call connector 164, and the traffic monitor 166 described above. A Micro Evolved Packet Core (EPC) 254 enables processing of LTE, 3G, 4G, 5G spectrum signals, and may be used in macro, micro, and pico base stations. The EPC that forms the core network of the LTE system can be composed of four network elements: the Serving Gateway (Serving GW), the Packet Data Network Gateway (PDN GW), the Mobility Management Entity (MME) which forms the core connector for signaling, and the Home Subscriber Server (HSS). The HSS is a database that contains user-related and subscriber-related information. It also provides support functions in mobility management, call and session setup, user authentication, and access authorization. The gateways e.g., Serving GW and Packet Data Network (PDN) GW deal with the user plane. They transport the Internet Protocol (IP) data traffic between the User Equipment (UE) and the external networks. The Serving GW is the point of interconnect between the radio side and the EPC. The Serving GW serves the UEs 192, 194, . . . , 198, by routing the incoming and outgoing IP packets. The PDN GW is the point of interconnect between the EPC and the external IP networks.

A power distribution board 256, which is mounted on the aerial, vehicular base station 150 enables the switching between different batteries. In an example, the aerial, vehicular base station 150 can be fitted with additional batteries and/or solar power sources and the power distribution board 256 can be configured to switch between the conventional batteries and the solar power sources. An electronic speed controller 258 may be included in the hardware to control the speed of the aerial, vehicular base station 150. Although not shown in FIGS. 2A and 2B, the aerial, vehicular base station 150 can also include a plurality of sensors. The sensors can include but are not limited to, temperature sensors, humidity sensors, altitude sensors, wind speed sensors, and/or sensors to identify the presence of specific materials in the atmosphere such as smoke detectors, etc. In addition to being transmitted back to the control system 110 for updating the flight path based on the real-time ground conditions, the sensor readings also enable driving the flight controller 242 to steer the aerial, vehicular base station 150 along the safest route away from dangerous situations that may damage the aerial, vehicular base station 150.

Figure 2C:
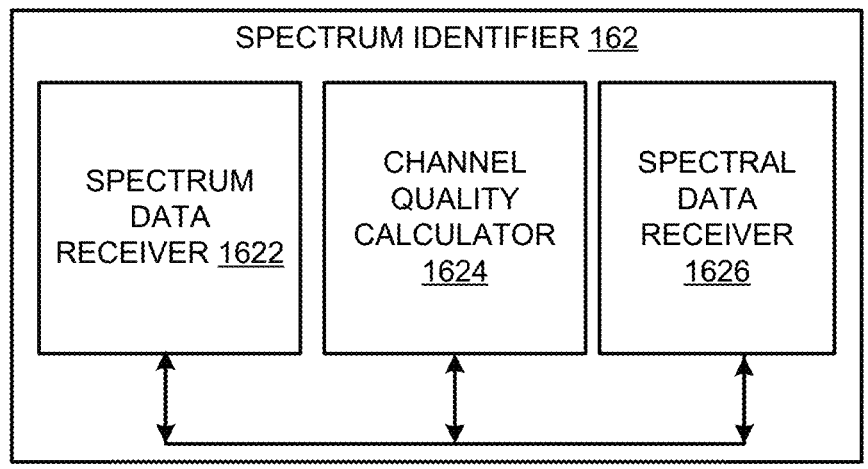
FIG. 2C shows a block diagram of a spectrum identifier of the aerial, vehicular base station in accordance with the examples disclosed herein.
Figure 2C:
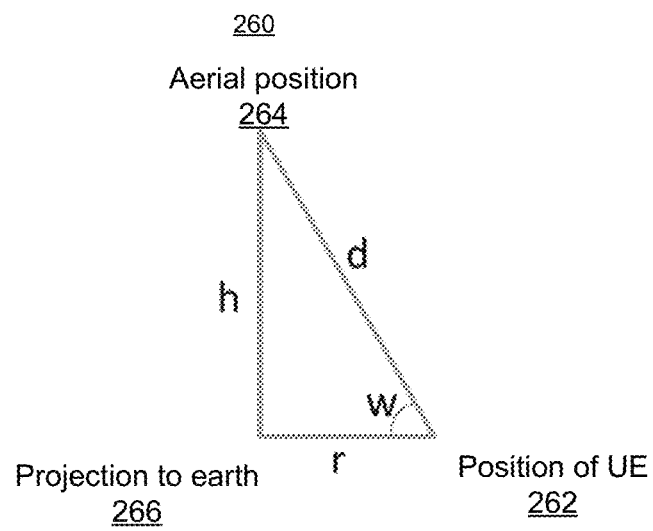

FIG. 2C shows a block diagram of the spectrum identifier 162 in accordance with the examples disclosed herein. The spectrum identifier 162 includes a spectrum data receiver 1622, a channel quality calculator 1624, and a channel selector 1626. The spectrum data receiver 1622 may receive information regarding the spectrum available for establishing communications from existing, operational terrestrial base stations. The existing infra frequency used by the terrestrial base stations and the backhaul frequency of the aerial, vehicular base station 150 may be orthogonal to each other thereby ensuring lower interference. The Euclidean distance between a user with a UE (e.g., one of the UE 192, 194, . . . ) in need of cellular service in one of the service areas and the aerial, vehicular base station 150 hovering at the service location can be obtained as:

$$d = \mathrm{Sqrt}(r2 + h2) \qquad \text{(Eq. 1)}$$

The wireless channel between the UE and the aerial, vehicular base station 150 can be modeled using the probabilistic line of sight model. The line of sight connection between a UE and the aerial, vehicular base station 150 depends on the angle (w) shown in triangle 260 which is formed from approximating the user device 262, the aerial position 264 of the aerial, vehicular base station 150 and the projection to the earth 266 of the aerial position 264. The probability of line of sight is calculated by the channel quality calculator 1624 as follows:

$$p = 1/(1 + a\,\exp(-b(w-a))) \qquad \text{(Eq. 2)}$$

where a and b are environment-dependent variables. The channel selector 1626 uses the available spectral frequencies and allocates them based on channel quality depending on the angle (w) between the users and the aerial, vehicular base stations. In disaster situations, some whitespace frequencies which is not used for any commercial or defense purposes may be allocated temporarily by the concerned authorities for better channel quality.

Figure 2D:
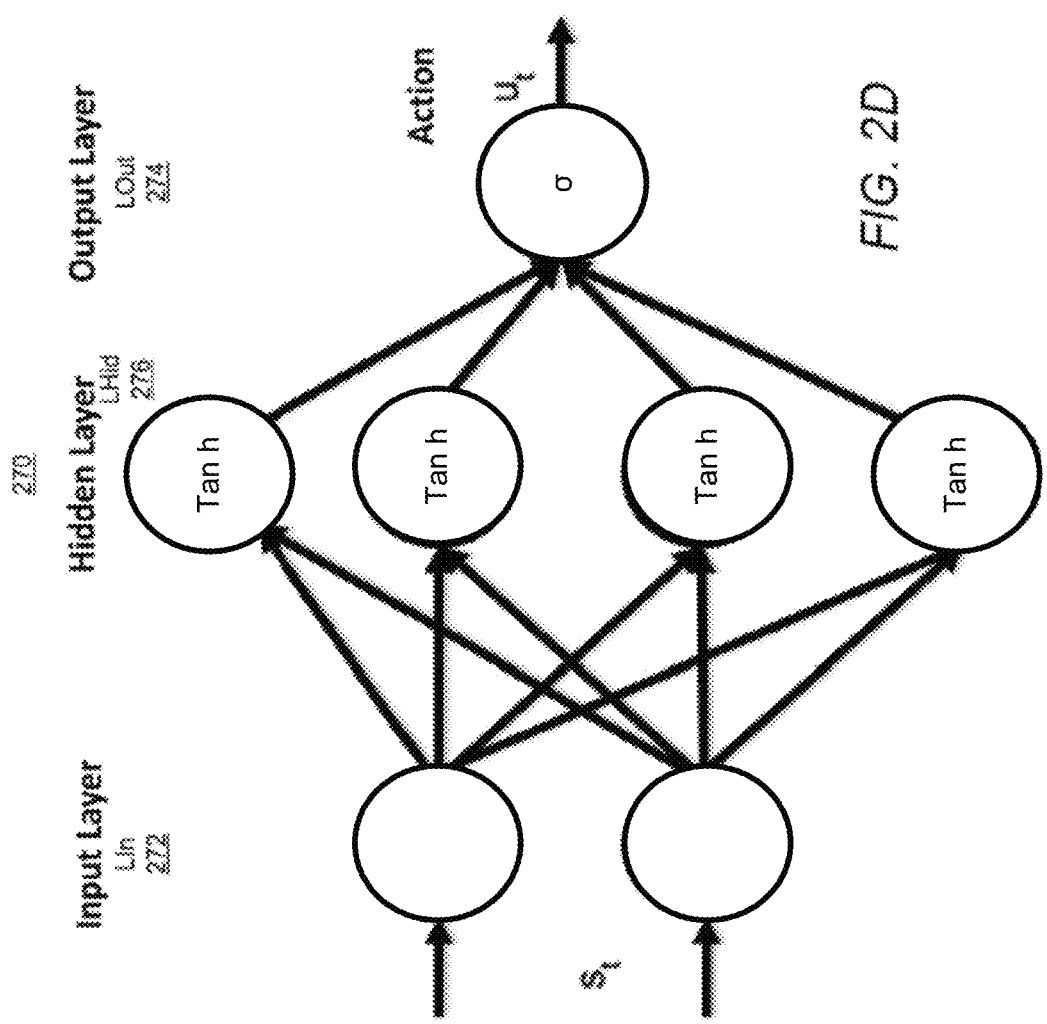
FIG. 2D shows a neural network used in an action controller of the aerial, vehicular base station in accordance with some examples disclosed herein.

FIG. 2D shows a neural network 270 implemented by the action controller 168 in accordance with some examples disclosed herein. The neural network 270 for takeoff dynamics determines the real-time actions of the aerial, vehicular base station 150 during the training period. A nonlinear regression model can be trained to forecast the upcoming state based on the given current state and the action(s) executed in that state. The deterministic time-invariant dynamic system can be defined as follows:

$$x = f(x, u) \tag{Eq. 3}$$

where x is a state vector, u is the input to the system and f is a function of states and inputs.

The neural network 270 can include a linear unit at input layers LIn 272 and output LOut layers 274 with the non-linearity in the hidden layer LHid 276 and parameter $\theta = [\theta 0, \theta 1]$ depicted by Eqs. 4 and. 5 shown below:

$$L\text{In} = \theta_0^T X \tag{Eq. 4}$$

$$L\text{Hid} = \max(0, L\text{In}) \tag{Eq. 5}$$

$$L\text{Out} = \theta_1^T L\text{Hid} \tag{Eq. 6}$$

where $X = [z_t, v_t, u_t]$ is input to the neural network 270 and $z_t, v_t, u_t$ are height, vertical velocity, and other parameters that determine flight path at time t respectively. The output of this network gives next state as $s_{t+1} = [z_{t+1}, v_{t+1}]$.

To train an autopilot for the aerial, vehicular base station 150, a parameterized policy $\pi_\varphi(a_t | s_t)$ with parameter $\varphi = [\varphi_0, \varphi_1]$ is defined which is a function of states $s_t = [z_t, v_t]$. Once trained, the neural network 270 outputs the action to be taken in that state. A two-layer neural network model can be defined with linear operation at the input layer $h_\varphi(s_t)$, hyperbolic tangent function in hidden units, and sigmoid a function in the output layer as shown in Eqs 7 to 9 below. The output of the sigmoid function ranges from 0 to 1 which can be easily interpreted as the percentage of the maximum thrust value.

$$h_\varphi(s_t) = \varphi_0^T s_t \tag{Eq. 7}$$

$$L\text{Hid} = \tan h(h_\varphi(s_t)) \tag{Eq. 8}$$

$$\pi_\varphi(a_t | s_t) = \sigma(\varphi_1^T L\text{Hid}) \tag{Eq. 9}$$

$$\text{where } \sigma(x) = 1/(1 + e^{-x}) \tag{Eq. 10}$$

For detection and localization of obstacles in the flight path, obstacle images can be captured in real-time via the FPV camera 220. However, existing object detection models are not especially well trained on the obstacle image data. So a new dataset can be prepared and a Convolutional Neural Network (CNN) model (not shown) can be trained on that new dataset for obstacle detection based on the input from the FPV camera 220. The first obstacle image data can be collected by the FPV camera 220 and then converted into a suitable data format with the correct label and the bounding box showing the correct location of the obstacles. These images may be fed into the CNN model for training in a manner similar to the operation applied in Eq. 3 above. The obstacles identified may not only include the conventional obstacles such as trees, buildings, telecommunication towers, etc. but may also include those specific to a disaster situation e.g., smoke limiting the camera view in a wildfire situation, or rain/fog/hail/snow obstructing the camera view in a storm thereby limiting the ability of control system 110 and/or a human operator to control the aerial, vehicular base station 150.

During the training mode of the neural network 270, learning includes a parameter optimization process. The learning process involves obtaining the weights of the neural network 270 which minimize the objective function. The objective function for model predictive network $J_{mp}$ is defined as the sum of squared error between predicted and actual state over a training dataset with total T time steps. Eqs. 9 and 10 define the optimization problem for a dynamic neural network model. For parameter update, the gradient descent algorithm as shown in Eq. 13 with backpropagation and batch normalization algorithms used, and the optimal parameter $\theta^*$ was found.

$$J_{mp} = 1/T \Sigma_{t=1}^{T} \| s_{t+1} - I_{out} \|^2 \tag{Eq. 11}$$

$$\theta^* = \arg\min_\theta J_{mp} \tag{Eq. 12}$$

$$\theta \leftarrow \theta - \alpha \nabla_\theta J_{mp} \tag{Eq. 13}$$

Similarly, an objective function Jp can be defined for learning autopilot behavior while considering the error between the autopilot command and the neural network pilot command and parameter update done.

$$J_p = 1/T \Sigma_{t=1}^{T} \| \pi_\varphi(a_t | s_t) - u_t \|^2 \tag{Eq. 14}$$

$$\varphi^* = \arg\min_\varphi J_p \tag{Eq. 15}$$

$$\varphi \leftarrow -\beta \nabla_\varphi J_p \tag{Eq. 16}$$

where $\alpha$ and $\beta$ are hyperparameters with a value less than one.

During the training period, experimental activities can be conducted for takeoff and hover flight of the aerial, vehicular base stations in an environment simulating different disaster zones. The neural network models described herein were built using a Google® open-source deep learning framework called Tensorflow®. The calculations were done offline on a computer for training the neural network model to be used onboard the aerial, vehicular base stations. Take-off and hover flight were simulated in an open-source 3D robotics simulator such as Gazebo®. An open-source autopilot firmware PX4 can be used for the generation of thrust commands for taking off and hovering. State and control command data were collected from a ground control station application Qgroundcontrol.

The collected height, velocity, and thrust command data from a simulated flight of the aerial, vehicular base station for takeoff can be used to train and test the neural network model for ten seconds while each time step size was 0.1 seconds. For training, one-step state prediction can be obtained for height and velocity. Observations from the training period indicate that the prediction of the neural network model for height is very close to the actual height except for the initial time of flight. The predictions in the case of testing on new states and action input data gave similar behavior.

Figure 3:
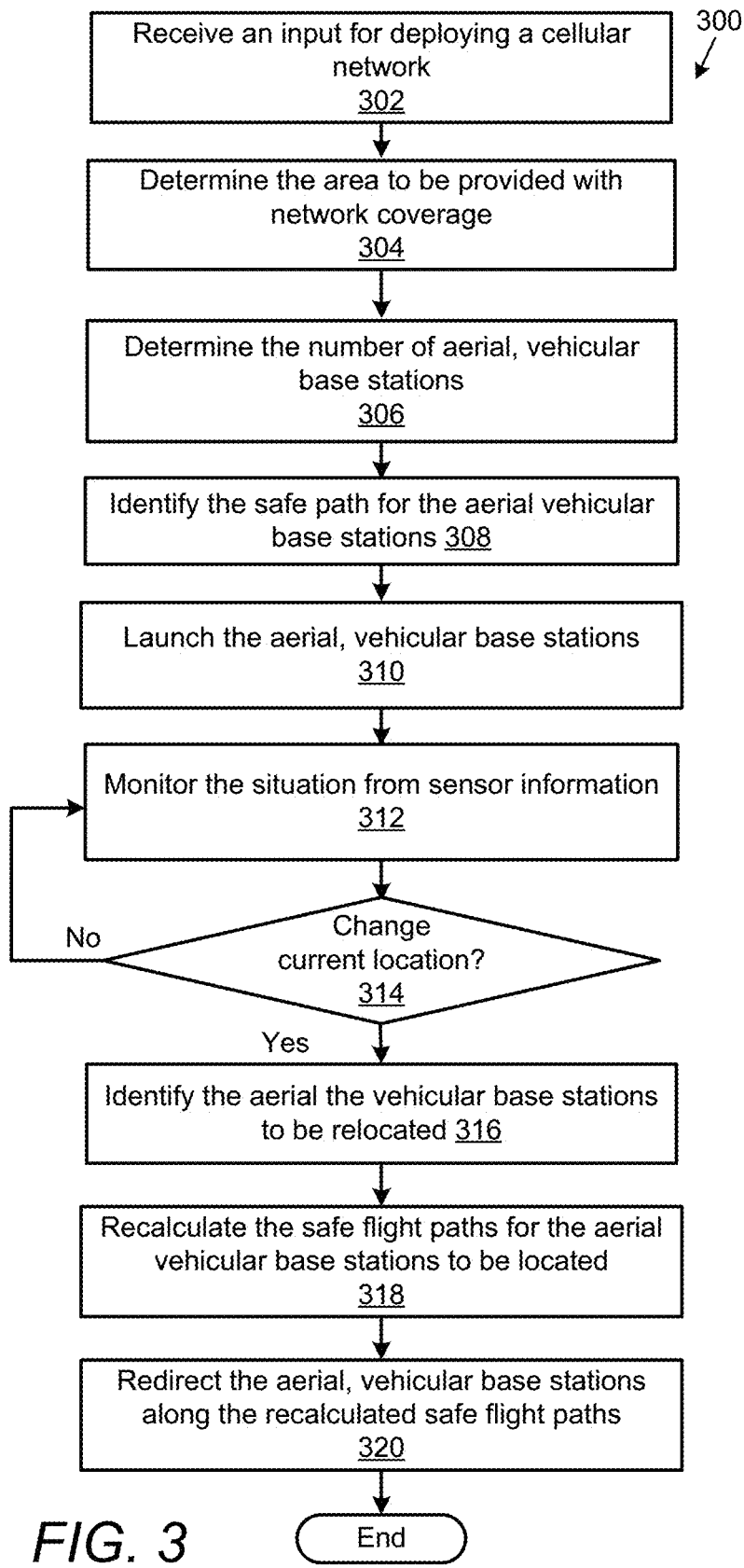
FIG. 3 shows a flowchart of a method of deploying a transportable cellular communications network in accordance with the examples disclosed herein.

FIG. 3 shows a flowchart 300 of a method of deploying a temporary cellular network in accordance with the examples disclosed herein. In an example, the method shown in the flowchart 300 can be executed by the control system 110. The method begins at 302 wherein an input for deployment for movable/ad-hoc cellular service network systems is received. The input may have been generated by an external system that receives information regarding an emergency, such as a natural disaster or a temporary gathering of a large number of people which requires network coverage, and accordingly, generates a request for transportable cellular communications network. The input can include the geographical location of a void area requiring network coverage in terms of global positioning system (GPS) coordinates or latitude and longitude and data regarding the ground conditions at the location such as the location is flooded, if the location is a site of forest fires, or if the location is temporarily hosting a particularly large number of people. At 304, the service area to be provided network coverage is determined based on the information received in the input. At 306, the number of aerial, vehicular base stations required to provide network coverage is determined. Various factors such as but not limited to, the range and the network traffic capacity of each aerial, vehicular base station, the area obtained at 304, the expected network traffic, are used to determine the number of aerial, vehicular base stations. At 308, a safe flight path to the geographical location with minimum risk of damage is identified for each aerial, vehicular base station. In case, there are no concerns regarding damage to the aerial, vehicular base station, then the shortest possible path may be identified at 308. At 310, the requisite number of aerial, vehicular base stations may be launched in different directions to travel along the corresponding safe flight paths from a point in the vicinity of the location. The situation in the area where the aerial, vehicular base stations are operating is monitored at 312 by receiving the sensor data from the aerial, vehicular base stations. Using the sensor data it is determined at 314 if the current location of the launched aerial, vehicular base stations continues to be safe or if any changes have occurred since the previous risk assessment. If the current location continues to be low risk, then the method returns to 312 to continue the monitoring. Else the method moves to 316 to identify those of the aerial, vehicular base stations to be relocated. A safe flight path is recalculated at 318 for the aerial, vehicular base stations that need to be relocated and the aerial, vehicular base stations are redirected along the recalculated safe flight paths to the new positions at 320. The new positions may involve optimizing between a low-risk location from the probability map which is at sufficient distance from the current position that there is no damage to the aerial, vehicular base stations yet close enough to the current location that the aerial, vehicular base stations can continue to provide cellular services. In an example, moving the aerial, vehicular base station(s) may involve returning one or more of the aerial, vehicular base stations from the field of operation to a warehouse or a safe location from where services cannot be provided. Multiple factors affect the choice of new locations including but not limited to, altitude, temperature, wind speed, air friction, vehicle uptime, and the nearest location to land safely as the battery is depleted. Both cognitive base stations and cognitive mobile stations may be deployed using the aforementioned methodology. Distance between the stations can be determined by population, density, and the topography of the region which may lead to faster signal attenuation.

Figure 4:
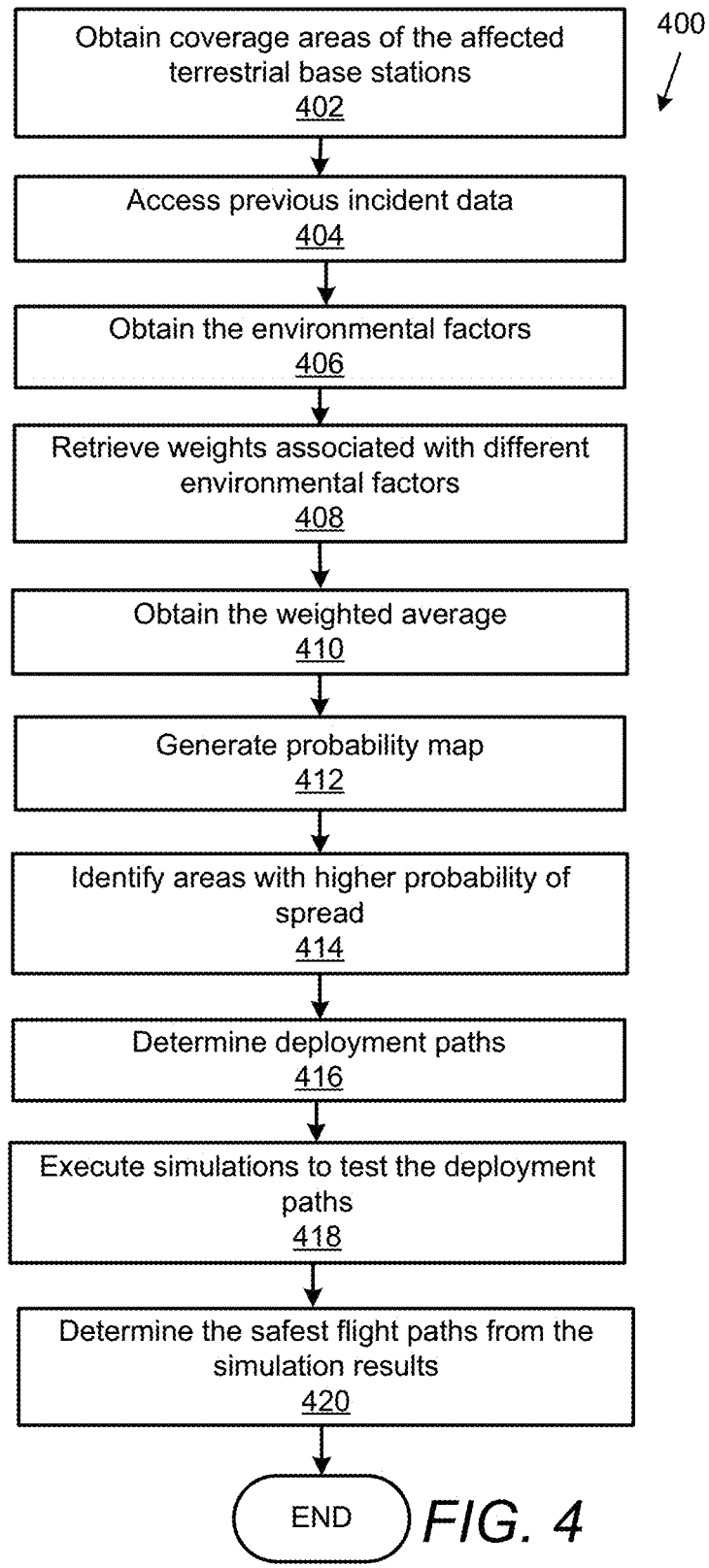
FIG. 4 shows a flowchart for a method of determining a safe flight path in accordance with the examples disclosed herein.

FIG. 4 shows a flowchart 400 for a method of determining a safe flight path in accordance with the examples disclosed herein. The method begins at 402 wherein the geographic locations enroute from a current geographical location of the aerial, vehicular base station 150 to the void areas or coverage areas of the various terrestrial base stations that are inoperative or operating at sub-optimal levels due to a current emergency can be obtained. The enroute geographical locations may include a predetermined extent of an area covering various paths from the current geographical location of the at least one aerial, vehicular base stations to the geographical location of the void area. At 404, the prior incident data of emergencies similar to the current emergency at the enroute geographical locations can be accessed. The prior incident data at a geographical location can include but is not limited to the frequency of occurrence of the emergencies, the dates, times, and severity of the prior incidents. In an example, the prior incident data can also include the occurrence of particular events such as sporting events, concerts, or other events where people are expected to gather in large numbers for a short duration which may temporarily strain the communication infrastructure but which may not justify the installation of permanent communication hardware.

Additionally, current values of the environmental factors that may be related to the current emergency within the coverage areas are obtained at 406. The environmental factors can include but are not limited to, temperature, humidity, precipitation, atmospheric pressure, etc. In an example, the control system 110 can be connected to data sources such as notification platforms which may provide environmental factor updates. At 408, the weights associated with one or more of the prior incident data and the different environmental factors are retrieved. In an example, the weights may be predetermined for each factor based on the importance of the factor in causing the current emergency. The weighted average of the various environmental factors for each of the coverage areas is obtained at 410. The probability of an emergency intensifying in the coverage areas or spreading to neighboring coverage areas can be calculated by using the weighted average of environmental factors, data from telecom assets with their coordinates, wind direction, line of impact, etc.

$$\text{Probability of the emergency spreading to a given geographical location} = w1x1+w2x2+w3x3+w4x4+w5x5+\ldots\ WnXn/(w1+w2+w3+w4+w5+\ldots wn) \quad \text{Eq. (15)}$$

wherein w1, w2, w3, and w4, are the weights of different factors reported across different regions for which the probability map is being calculated.

Based at least on the prior incident data, a probability map is generated at 412 to reflect the likelihood of occurrence of an incident at various service locations in a given area. For example, the probability map may reflect the likelihood of the aerial, vehicular base station 150 being affected by the incidents at a given location. The areas with a higher probability of spread or the area likely to be affected by the disaster are identified at 414. At 416, the Bellman-Ford method may be used to determine one or more paths for the deployment of the aerial, vehicular base station 150 to a corresponding location based on various parameters such as temperature, altitude, wind speed, terrain, etc., and the risk probabilities as reflected by the probability map. In an example, the weighted averages can be ordered in an increasing or decreasing order and a safe flight path for the aerial, vehicular base station 150 can be determined so that the safe flight path passes through regions of lower risk or lower probabilities of spread so that the aerial, vehicular base station 150 is not affected by the disaster. Tools can be used to simulate the disaster spread in the regions and changes in wind direction to ensure multiple scenarios, probability maps can be established and flight paths can be simulated so that the aerial, vehicular base station 150 has multiple fallback plans in situations where environmental factors or wind has changed before the aerial, vehicular base station 150 is sent for operation. Simulation helps in determining the acceleration or speed of the aerial, vehicular base station 150 to reach the location to serve users.

Accordingly, simulations are executed at 418 to test the deployment paths thereby ensuring the safe deployment of the aerial, vehicular base station 150 in multiple emergency scenarios and multiple likely scenarios, in case there are changes in any of the factors. The safe flight path for the aerial, vehicular base station 150 is determined from the simulation results at 420. Based at least on the probability map, the flight path encompassing the lowest probability of facing the disaster can be used as the safe flight path for the aerial, vehicular base station(s) 150. The safe flight path can be simulated for various possible wind scenarios and based on existing conditions the flight path is changed dynamically in real-time. Again, if there is any change in the assumptions or predictions associated with the natural disaster, the position of the aerial, vehicular base station 150 may be recalculated as outlined above.

Figure 5:
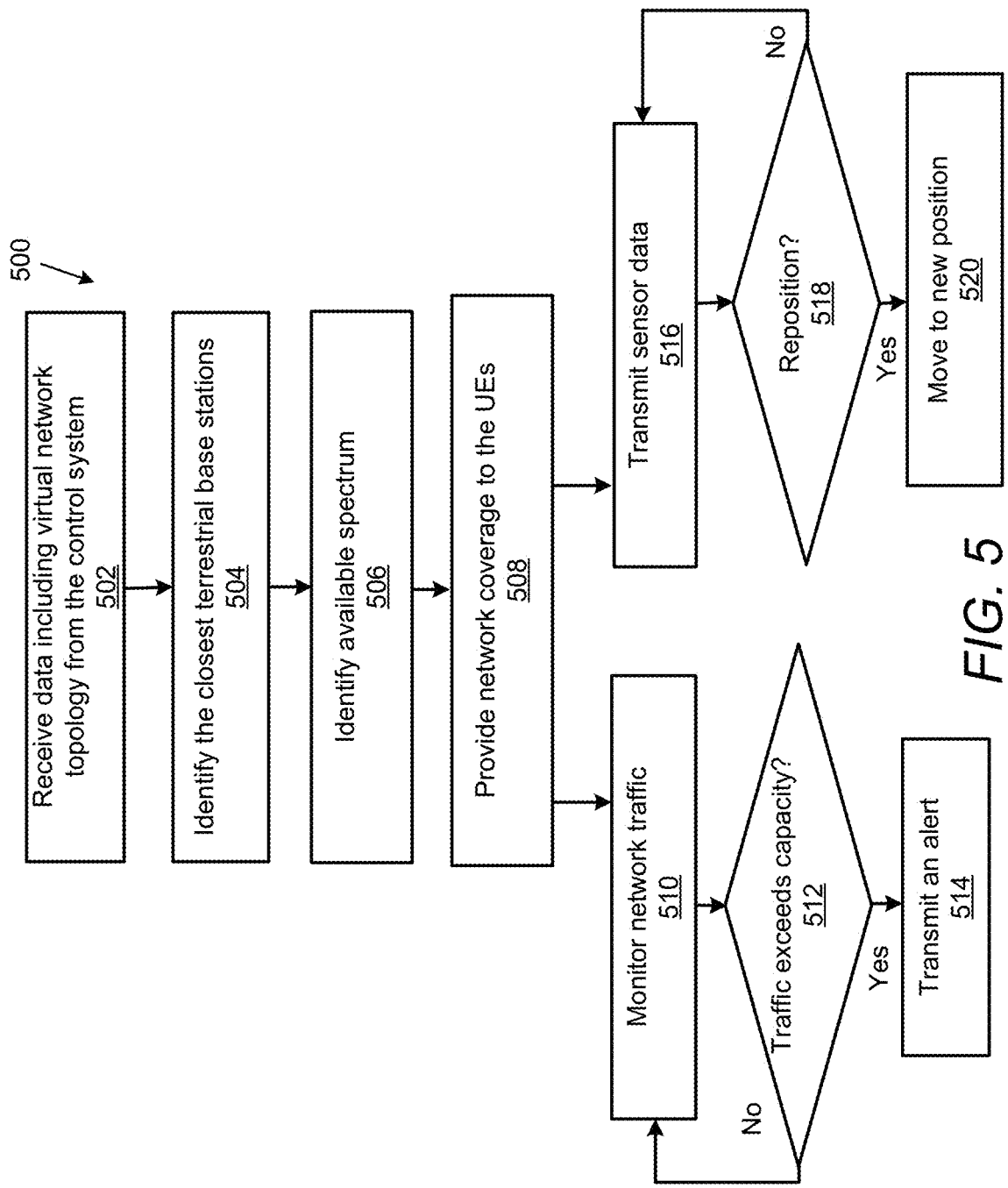
FIG. 5 shows a flowchart that details the processes implemented by the aerial, vehicular base station to provide cellular connectivity in accordance with the examples disclosed herein.

FIG. 5 shows a flowchart 500 that details the processes implemented by the aerial, vehicular base station 150 to provide cellular connectivity to the UE 192, 194, . . . , in accordance with the examples disclosed herein. Upon reaching the service location through the safest flight path, the aerial, vehicular base station 150 receives at 502, data from the control system 110 including a virtual network topology. The aerial, vehicular base station 150 identifies the closest base stations at 504 from the virtual network topology by employing methodologies such as but not limited to, KNN. Links across the existing network where the Cognitive Radio (CR) Base Station and CR mobile stations are being deployed are established while also maximizing transmission distance and avoiding non-linear errors in multi-hop transmission. In an example, the control system 110 can include a virtual network topology generator including a support vector machine (SVM) that analyzes the geographical region of the location where the aerial, vehicular base station 150 is to operate to identify cellular infrastructure such as cellular communication towers, base stations, control centers, etc., that the aerial, vehicular base station 150 can connect to in order to provide communication services. This information is available from the physical network inventory databases of the cellular operators. The output of the SVM can be provided to a Bayesian network to generate a virtual network topology which is then transmitted to the aerial, vehicular base station 150 that employs KNN techniques to identify the operating base stations in the vicinity. Particularly, Bayesian Networks help to amend the virtual network topology based on recent failures, and CR-based network additions thereby determining the fastest hop available to connect a call to a destination. One or more of a Bayesian Network optimization and a multi-fidelity optimization technique may also be employed to approximate feasibility constraints based on different experiments.

On identifying the network elements that can provide connectivity, the aerial, vehicular base station 150 employs spectrum sensing functions of the cognitive radio (CR) mobile stations at 506 to identify the available spectrum for conducting communications. At 508 the aerial, vehicular base station 150 begins to provide cellular network coverage to the UE 192, 194, . . . . While providing network coverage the aerial, vehicular base station 150 may also carry out certain monitoring functions. For example, the aerial, vehicular base station 150 monitors the traffic volume using HMM at 510 while providing network services. If it is determined at 512 that the traffic volume exceeds a predetermined limit corresponding to the capacity of the aerial, vehicular base station 150, an alert is transmitted at 514 to the control system 110 regarding excessive traffic and if the traffic stays within capacity, the aerial, vehicular base station 150 continues with monitoring the network traffic at 508. Furthermore, the sensors on the aerial, vehicular base station 150 also transmit data regarding the ground conditions at the service location to the control system 110 at 516. If at 516, an alert is received from the control system 110 for repositioning, the aerial, vehicular base station 150 moves to a different location at 518 using the safe flight are provided by the control system 110. Therefore, it is ensured that if the deployment path changes while the network coverage activity is in progress, in case of any change in assumptions or predictions associated with the coverage area, continuous monitoring, and recalibration of the position of the aerial, vehicular base station 150 can occur from time to time.

Figure 6:
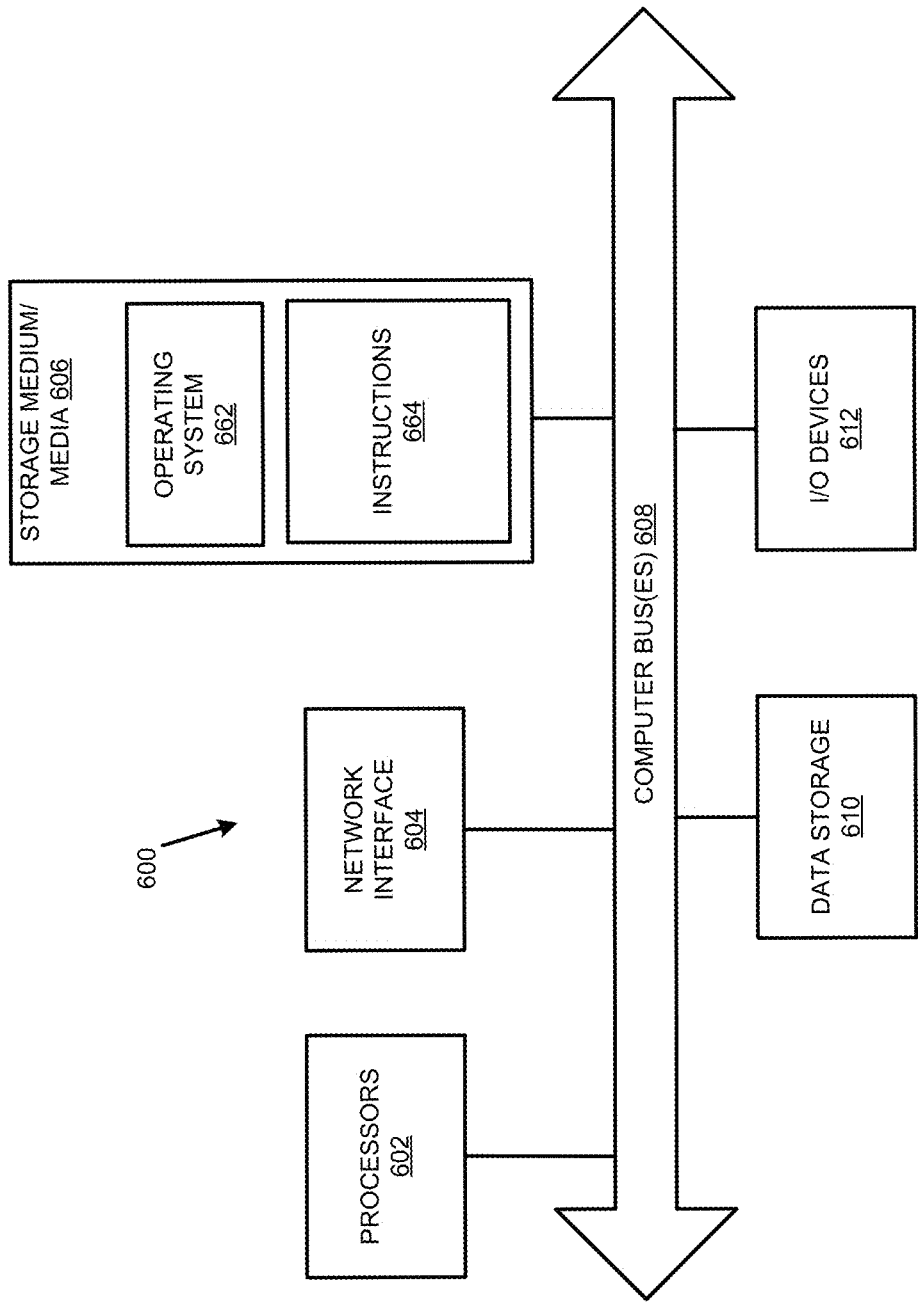
FIG. 6 illustrates a computer system that may be used to implement a control system in accordance with the examples disclosed herein.

FIG. 6 illustrates a computer system 600 that may be used to implement the control system 110. More particularly, computing machines such as desktops, laptops, smartphones, tablets, and wearables which may be used to generate or access the data from the control system 110 may have the structure of the computer system 600. The computer system 600 may include additional components not shown and that some of the process components described may be removed and/or modified. In another example, a computer system 600 can sit on external-cloud platforms such as Amazon Web Services, AZURE® cloud or internal corporate cloud computing clusters, or organizational computing resources, etc.

The computer system 600 includes processor(s) 602, such as a central processing unit, ASIC or another type of processing circuit, input/output devices 612, such as a display, mouse keyboard, etc., a network interface 604, such as a Local Area Network (LAN), a wireless 802.11x LAN, a 3G, 4G or 6G mobile WAN or a WiMax WAN, and a processor-readable medium 606. Each of these components may be operatively coupled to a bus 608. The computer-readable medium 606 may be any suitable medium that participates in providing instructions to the processor(s) 602 for execution. For example, the processor-readable medium 606 may be a non-transitory or non-volatile medium, such as a magnetic disk or solid-state non-volatile memory, or a volatile medium such as RAM. The instructions or modules stored on the processor-readable medium 606 may include machine-readable instructions 664 executed by the processor(s) 602 that cause the processor(s) 602 to perform the methods and functions of the control system 100.

The control system 110 may be implemented as software or machine-readable instructions stored on a non-transitory processor-readable medium and executed by one or more processors 602. For example, the processor-readable medium 606 may store an operating system 662, such as MAC OS, MS WINDOWS, UNIX, or LINUX, and code 664 for the AI-based schema matching and content alignment system 100. The operating system 662 may be multi-user, multiprocessing, multitasking, multithreading, real-time, and the like. For example, during runtime, the operating system 662 is running and the code for the Control system 110 is executed by the processor(s) 602.

The computer system 600 may include a data storage 610, which may include non-volatile data storage. The data storage 610 stores any data used by the control system 110. The data storage 610 may be used as the data storage 170 to store the probability maps, the sensor data, the locations of the aerial, vehicular base stations, and other data used during the operation of the control system 110.

The network interface 604 connects the computer system 600 to internal systems for example, via a LAN. Also, the network interface 604 may connect the computer system 600 to the Internet. For example, the computer system 600 may connect to web browsers and other external applications and systems via the network interface 604.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A system for providing transportable cellular communication networks comprising:
   one or more aerial, vehicular base stations, wherein each of the one or more aerial, vehicular base stations includes communication hardware that facilitates cellular communications for one or more user devices; and
   a control system including at least:
      at least one storage device storing processor-readable instructions; and
      one or more processors executing the processor-readable instructions that cause the one or more processors to control the one or more aerial, vehicular base stations in a void area for facilitating the cellular communications for the one or more user devices, wherein the void area is a geographical location with sub-optimal communications network coverage,
   wherein to control the one or more aerial, vehicular base stations the one or more processors are to further:
      identify the geographical location of the void area based at least on data regarding one or more terrestrial base stations operating at sub-optimal levels within the void area; and
      determine a number of the one or more aerial, vehicular base stations required to service the void area based at least on a network traffic capacity of each of the one or more aerial, vehicular base stations, an expected network traffic, and an extent of the void area.

2. The system of claim 1, wherein to control the one or more aerial, vehicular base stations the one or more processors are to further:
   identify a safe flight path from a current geographical location of the one or more aerial, vehicular base stations to the geographical location of the void area, wherein the safe flight path has a lower risk of damage to at least one of the one or more aerial, vehicular base stations as compared to other deployment paths between the current geographical location of the at least one aerial, vehicular base station and the geographical location of the void area.

3. The system of claim 2, wherein to identify the safe flight path to the geographical location the one or more processors are to further:
   receive prior incident data including frequency of occurrence of emergencies similar to a current emergency at the geographical location, wherein the prior incident data is received for each geographical location enroute from the current geographical location of the at least one aerial, vehicular base station to the geographical location of the void area; and
   receive current values of environmental factors related to the current emergency at each of the enroute geographical locations.

4. The system of claim 3, wherein to identify the safe flight path to the geographical location the one or more processors are to further:
   obtain a weighted average of the current values of the environmental factors for the enroute geographical locations;
   generate a probability map of the geographical location and the enroute geographical locations based on the weighted averages; and
   identify the safe flight path through one or more of the enroute geographical locations having lower values for the weighted averages.

5. The system of claim 1, wherein to control the one or more aerial, vehicular base stations the one or more processors are to further:
   receive sensor data from at least one of the one or more aerial, vehicular base stations wherein the sensor data provides current values for environmental factors.

6. The system of claim 5, wherein to control the one or more aerial, vehicular base stations the one or more processors are to further:
   determine that a current location of the at least one aerial, vehicular base station has to be changed based on the sensor data;
   recalculate a safe flight path to a new geographical location for the at least one aerial, vehicular base station, wherein the new geographical location has a lower risk of damage due to a current emergency to the at least one aerial, vehicular base station than the current location; and
   provide the recalculated safe flight path to the at least one aerial, vehicular base station.

7. A method of providing cellular communication networks comprising:
   providing one or more aerial, vehicular base stations, wherein each of the one or more aerial, vehicular base stations includes communication hardware that facilitates cellular communications for one or more user devices;
   providing a control system for the one or more aerial vehicular base stations;
   including within the control system, at least one storage device storing processor-readable instructions and one or more processors executing the processor-readable instructions that cause the one or more processors to control the one or more aerial, vehicular base stations in a void area, wherein the void area is a geographical location with sub-optimal communications network coverage;
   controlling the one or more aerial, vehicular base stations by the one or more processors by:
      identifying the geographical location of the void area based at least on data regarding one or more terrestrial base stations operating at sub-optimal levels within the void area; and
      determining a number of the one or more aerial, vehicular base stations required to service the void area based at least on a network traffic capacity of each of the one or more aerial, vehicular base stations, an expected network traffic, and an extent of the void area.

8. The method of claim 7, wherein controlling the one or more aerial, vehicular base stations further comprises: identifying, by the one or more processors, a safe flight path from a current geographical location of at least one of the one or more aerial, vehicular base stations to the geographical location of the void area, wherein the safe flight path has a lower risk of damage to the at least one aerial, vehicular base station as compared to other deployment paths between the current geographical location of the at least one aerial, vehicular base station and the geographical location of the void area.

9. The method of claim 8, wherein identifying the safe flight path to the geographical location further comprises:
identifying, by the one or more processors, the current geographical location of the at least one aerial, vehicular base station; and
receiving, by the one or more processors, prior incident data including frequency of occurrence of emergencies similar to a current emergency at the geographical location, wherein the prior incident data is received for each geographical location enroute from the current geographical location of the at least one aerial, vehicular base station to the geographical location of the void area.

10. The method of claim 9, wherein identifying the safe flight path to the geographical location further comprises:
receiving, by the one or more processors, current values of environmental factors related to the current emergency at each of the enroute geographical locations.

11. The method of claim 10, wherein identifying the safe flight path to the geographical location further comprises:
obtaining, by the one or more processors, a weighted average of the current values of the environmental factors for the enroute geographical locations;
generating, by the one or more processors, a probability map of the geographical location and the enroute geographical locations based on the weighted averages; and
identifying, by the one or more processors, the safe flight path through one or more of the enroute geographical locations having lower values for the weighted averages.

12. The method of claim 7, wherein to controlling the one or more aerial, vehicular base stations further comprises:
receiving, by the one or more processors, sensor data from at least one of the one or more aerial, vehicular base stations wherein the sensor data provides current values for environmental factors.

13. The method of claim 12, wherein controlling the one or more aerial, vehicular base stations further comprises:
determining, by the one or more processors, that a current location of the at least one aerial, vehicular base station has to be changed based on the sensor data;
recalculating, by the one or more processors, a safe flight path to a new geographical location for the at least one aerial, vehicular base station, wherein the new geographical location has a lower risk of damage due to a current emergency to the at least one aerial, vehicular base station than the current location; and
providing, by the one or more processors, the recalculated safe flight path to the at least one aerial, vehicular base station.

14. A control system including at least one storage device storing processor-readable instructions that cause one or more processors to control one or more aerial, vehicular base stations in a void area for facilitating the cellular communications for one or more user devices, wherein the void area is a geographical location with sub-optimal communications network coverage,
wherein to control the one or more aerial, vehicular base stations the one or more processors are to further:
identify the geographical location of the void area based at least on data regarding one or more terrestrial base stations operating at sub-optimal levels within the void area; and
determine a number of the one or more aerial, vehicular base stations required to service the void area based at least on a network traffic capacity of each of the one or more aerial, vehicular base stations, an expected network traffic, and an extent of the void area.

15. The control system of claim 14, wherein to control the one or more aerial, vehicular base stations the at least one storage device stores processor-readable instructions that cause the one or more processors to further:
identify a safe flight path from a current geographical location of the one or aerial, vehicular base stations to the geographical location of the void area,
wherein the safe flight path has a lower risk of damage to at least one of the one or more aerial, vehicular base stations as compared to other deployment paths between the current geographical location of the one or aerial, vehicular base stations and the geographical location of the void area.

16. The control system of claim 15, wherein to identify the safe flight path to the geographical location the at least one storage device stores processor-readable instructions that cause the one or more processors to further:
receive prior incident data including frequency of occurrence of emergencies similar to a current emergency at the geographical location, wherein the prior incident data is received for each geographical location enroute from the current geographical location of the at least one aerial, vehicular base stations to the geographical location of the void area; and
receive current values of environmental factors related to the current emergency at each of the enroute geographical locations.

17. The control system of claim 16, wherein to identify the safe flight path to the geographical location the at least one storage device stores processor-readable instructions that cause the one or more processors to further:
obtain a weighted average of the current values of the environmental factors for the enroute geographical locations;
generate a probability map of the geographical location and the enroute geographical locations based on the weighted averages; and
identify the safe flight path through one or more of the enroute geographical locations having lower values for the weighted averages.

18. The control system of claim 15, wherein to control the one or more aerial, vehicular base stations the at least one storage device stores processor-readable instructions that cause the one or more processors to further:
receive sensor data from at least one of the one or more aerial, vehicular base stations wherein the sensor data provides current values for environmental factors.

19. The control system of claim 18, wherein to control the one or more aerial, vehicular base stations the at least one storage device stores processor-readable instructions that cause the one or more processors to further:
determine that a current location of the at least one aerial, vehicular base station has to be changed based on the sensor data;
recalculate a safe flight path to a new geographical location for the at least one aerial, vehicular base station, wherein the new geographical location has a lower risk of damage due to a current emergency to the at least one aerial, vehicular base station than the current location; and provide the recalculated safe flight path to the at least one aerial, vehicular base station.

\* \* \* \* \*